United States Patent [19]
Davis

[11] Patent Number: 5,114,058
[45] Date of Patent: May 19, 1992

[54] FISH STRINGER WITH HAND-GRIP FOR HORIZONTAL CARRYING

[76] Inventor: Ronnie D. Davis, 204 Royal Ct., Forest, Va. 24551

[21] Appl. No.: 697,555

[22] Filed: May 9, 1991

[51] Int. Cl.⁵ .............................................. A01K 65/00
[52] U.S. Cl. .................................... 224/103; 43/54.1; 294/158; 294/166
[58] Field of Search ................. 224/103, 253; 43/54.1, 43/55; 294/158, 166

[56] References Cited

U.S. PATENT DOCUMENTS

| | | | |
|---|---|---|---|
| 827,855 | 8/1906 | Farmer | 43/55 |
| 1,975,754 | 10/1934 | Plueger | 224/103 |
| 2,354,848 | 8/1944 | Carpenter | 224/103 |
| 2,455,766 | 12/1948 | Harvey | 224/103 |
| 2,539,496 | 1/1951 | Towey | 224/103 |
| 2,592,389 | 4/1952 | Budy | 224/103 |
| 2,731,180 | 1/1956 | Fricker et al. | 224/103 |
| 2,788,165 | 4/1957 | Montgomery | 224/103 |
| 3,072,307 | 1/1963 | Shook | 224/103 |
| 3,081,576 | 3/1962 | Collins | 43/53.5 |
| 3,098,592 | 7/1963 | Eisman | 224/103 |
| 3,263,879 | 8/1966 | Sanderson | 224/103 |
| 3,803,742 | 4/1974 | Foster | 43/4 |
| 4,090,651 | 5/1978 | Raquel | 224/103 |
| 4,313,549 | 2/1982 | Nelson | 224/103 |
| 4,656,771 | 4/1987 | Holmes | 296/166 X |
| 4,830,244 | 5/1989 | Brannon | 224/103 |
| 4,960,231 | 10/1990 | Popovich | 224/253 X |
| 5,031,809 | 7/1991 | Roberts et al. | 224/103 |

Primary Examiner—Henry J. Recla
Assistant Examiner—Glenn T. Barrett
Attorney, Agent, or Firm—David H. Semmes

[57] ABSTRACT

Fish stringers, particularly a resilient longitudinally extending stringer arm. An upper hand-gripping end of the stringer arm may be adjustably secured to the fisherman's belt or waders. The lower, free end of the stringer arm spears hooked fish. A pivoted carrying arm is secured to the upper end of the stringer arm and extends outwardly so as to define an alternate hand-gripping portion and inwardly to encircle and releasably engage the free end of the stringer arm. The stringer arm is characterized by its ability to adjustably support a load of fish in the desired juxtaposition with the fisherman's thigh and upon release may be carried in a horizontal mode by a hand-gripping portion defined in the pivoted carrying arm.

4 Claims, 1 Drawing Sheet

FISH STRINGER WITH HAND-GRIP FOR HORIZONTAL CARRYING

BACKGROUND OF THE INVENTION

1. Field of Invention

Fish stringers, particularly a lightweight assembly for adjustable securement to the fisherman's belt or waders and including a resilient carrying loop for carrying fish in a horizontal mode upon detachment of the stringer.

2. Description of the Prior Art:

| | |
|---|---|
| PFLUEGER | 1,975,754 |
| HARVEY | 2,455,766 |
| TOWEY | 2,539,496 |
| BUDY | 2,592,389 |
| COLLINS | 3,081,576 |
| FOSTER | 3,803,742 |
| RAQUEL | 4,090,651 |
| BRANNON | 4,830,244 |

The foregoing patents are being discussed in an independently filed INFORMATION DISCLOSURE STATEMENT.

SUMMARY OF THE INVENTION

A fish stringer including a stringer arm having a hand-gripping end and a free end. A pivoted carrying arm is secured at an upper end to the hand-gripping end of the stringer and extends outwardly to define an alternate or horizontal hand-gripping portion and inwardly to releasably engage the lower, free end of the stringer arm. The pivoted carrying arm enables carrying of a balanced load of fish in a horizontal mode, as the stringer arm is detached from the fisherman's clothing.

DESCRIPTION OF THE DRAWINGS

In FIG. 1 fish stringer 10 is illustrated as including a longitudinally extending resilient stringer arm 12, having a hand-grip 14 secured in its upper hand-gripping end, so as to define a concavity 18 for engaging the fisherman's palm and individual indentations 16 for engaging the fisherman's fingers. A rotatable swivel 20 is secured to the upper end of the stringer arm, so as to releasably support leather strap 22 which may be adjustably secured to the fisherman's belt or waders.

Figure 1:
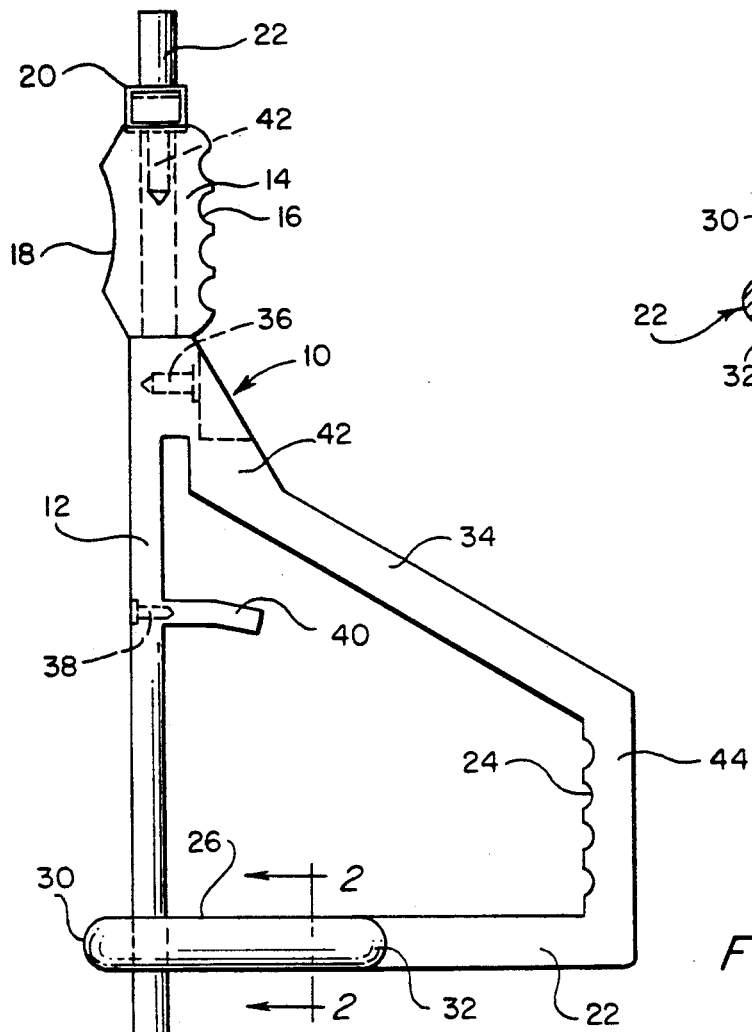
FIG. 1 is a front elevation of the stringer arm and resilient carrying arm.
Figure 2:
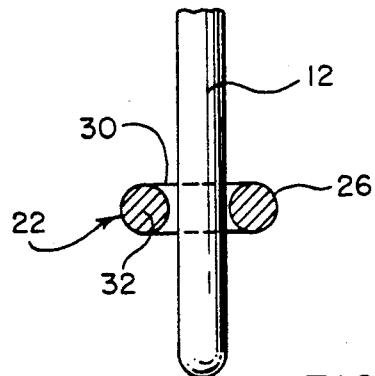
FIG. 2 is a fragmentary end elevation of the resilient carrying arm encircling the lower free end of the stringer arm.
Figure 3:
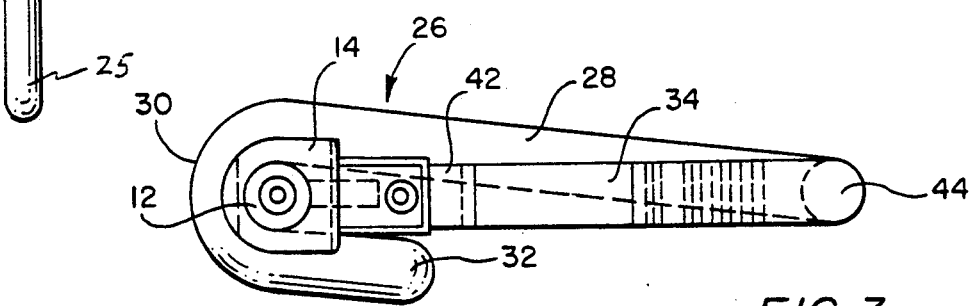
FIG. 3 is a top plan.
Figure 4:
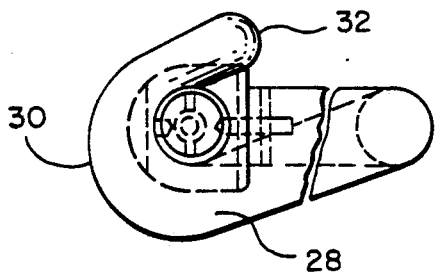
FIG. 4 is an enlarged fragmentary bottom plan of the carrying arm encircling the stringer arm.

A resilient carrying arm 34 is pivoted at an upper end 42 by means of set screw 36, or the like, such that its outwardly extending hand-gripping portion 44 defines hand-grip 24 and its inwardly extending lower portion 22 forms a loop 26 which encircles as at 30 the free end 25 of stringer arm 12. Thus, free end 32 of loop 26 is in parallel with the inwardly extending lower portion 22.

As will be apparent, the resilient stringer arm 12 may be pivoted such that its free end 22 may be removed from encirclement by loop 26 when placing or spreading fish on the stringer arm. An intermediate stop 40 may be secured to stringer arm 12 by means of set screw 38, or the like, so as to limit the movement of speared fish on the stringer arm.

As will be apparent, adjustable strap 22 enables vertical adjustment of fish stringer assembly, so that it abuts appropriately the thigh of the fisherman, as he is engaged in fishing. As hooked fish are speared on stringer arm 12 and the strap 22 is released, the stringer arm may be carried via alternate hand-grip 24 in a horizontal and balanced mode. In this horizontal mode, the fish are balanced intermediate stop 40 and carrying arm encirclement 30 which serves as a base for support of the weighted free end of the stringer arm 25.

Manifestly, swivel 20 may be fully rotatable through 360 degrees, depending upon the load of fish which is speared upon the stringer arm. Removable closure or loop 26, when engaging the stringer arm 12 free end 25, serves as a lower catch for fish supported on the stringer arm and as a balance of stringer arm 12 when the stringer assembly is carried in a horizontal mode by means of hand-grip 24.

Manifestly, variations in both the construction of the stringer arm and the pivoted carrying arm may be employed without departing from the spirit of invention.

I claim:

1. A stringer for fish comprising:
    a. a resilient, longitudinally extending stringer arm having a hand-gripping end and a free end; being adapted to receive fish;
    b. a handle attached to said hand gripping end and having a rotatable loop secured thereto;
    c. a pivoted carrying arm having an upper end and a lower end, said carrying arm being resiliently secured at said upper end to the hand-gripping end of said stringer arm and extending outwardly so as to define an alternate hand-gripping portion and extending inwardly at said lower end to encircle and releasably engage said free end of said stringer arm, said carrying arm defining a C-shaped loop extending from said hand-gripping end to said free end of said stringer arm; and
    d. a laterally extending stop positioned upon said stringer arm intermediate said hand-gripping end and said free end.

2. A stringer for fish and in claim 1, said pivoted carrying arm lower end being offset with respect to said upper end, so as to encircle the stringer arm free end.

3. A stringer for fish as in claim 2, said pivoted carrying arm lower end encircling as a hook said free end of said stringer arm and defining a bearing surface for support of said stringer arm as said stringer is carried in a horizontal mode by said alternate hand-grasping portion.

4. A stringer for fish as in claim 3, said rotatable loop having an adjustable carrying strap affixed thereto.

* * * * *